(12) United States Patent
Cho et al.

(10) Patent No.: US 9,628,767 B2
(45) Date of Patent: Apr. 18, 2017

(54) METHOD AND SYSTEM FOR MULTI-PROJECTION

(71) Applicant: Electronics and Telecommunications Research Institute, Daejeon (KR)

(72) Inventors: Yong Ju Cho, Daejeon (KR); Sang Woo Ahn, Daejeon (KR); Joo Myoung Seok, Daejeon (KR); Seong Yong Lim, Daejeon (KR); Ji Hun Cha, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 298 days.

(21) Appl. No.: 14/323,509

(22) Filed: Jul. 3, 2014

(65) Prior Publication Data
US 2015/0009390 A1  Jan. 8, 2015

(30) Foreign Application Priority Data

Jul. 4, 2013 (KR) .......... 10-2013-0078138
Jun. 11, 2014 (KR) .......... 10-2014-0070856

(51) Int. Cl.
*H04N 9/31* (2006.01)
*G03B 21/14* (2006.01)

(52) U.S. Cl.
CPC ......... *H04N 9/3194* (2013.01); *G03B 21/147* (2013.01); *H04N 9/3147* (2013.01); *H04N 9/3182* (2013.01)

(58) Field of Classification Search
CPC .. H04N 9/3147; H04N 9/3182; H04N 9/3194; G03B 21/147; G03B 21/005; G03B 21/006; G03B 21/008; G09G 2310/027
USPC ................ 353/30, 31, 94; 345/690
See application file for complete search history.

(56) References Cited

U.S. PATENT DOCUMENTS

2007/0188719 A1* 8/2007 Jaynes .................. G03B 21/00
                                                  353/94
2008/0143978 A1* 6/2008 Damera-Venkata ... G09G 3/002
                                                  353/94
2011/0234921 A1* 9/2011 Ivashin ................ H04N 9/3147
                                                  348/745

FOREIGN PATENT DOCUMENTS

JP    2007148416 A    6/2007
JP    2012165091 A    8/2012

* cited by examiner

*Primary Examiner* — William C Dowling
*Assistant Examiner* — Ryan Howard
(74) *Attorney, Agent, or Firm* — William Park & Associates Ltd.

(57) ABSTRACT

The present specification is related to a method for performing multi-projection and a multi-projection system for minimizing a black offset in a multi-projection environment. The present specification provides the method for performing multi-projection comprising estimating the intensity transfer function (ITF) of a plurality of projectors, calculating an optimal black offset threshold for each of the projectors by using each of the ITFs, and applying the optimal black offset threshold to an image projection by each of the projectors.

16 Claims, 7 Drawing Sheets

(a)

(b)

(a)

(b)

METHOD AND SYSTEM FOR MULTI-PROJECTION

This application claims the benefit of priority of Korean Patent Application No. 10-201 3-00781 38 filed on Jul. 4, 2013, and Korean Patent Application No. 10-2014-0070856 filed on Jun. 11, 2014, which are incorporated by reference as if fully set forth.

BACKGROUND OF THE INVENTION

Field of the Invention

The present invention is related to image display and more particularly, a method and an apparatus for minimizing a black offset in a multi-projection environment.

Discussion of the Related Art

The projector is not able to project black color properly, that is, it projects black color with a certain intensity of gray color (for example, (R, G, B) =(25, 25, 25)), not pure black ((R, G, B) =(0, 0, 0)) on a screen.

For this reason, when a dark image which is close to pure black of high definition such as a panorama with a multi-projector is projected on a large screen, a black offset phenomenon occurs on an overlapped region.

FIG. 1 illustrates an example of occurrence of the black offset on multi-projection according to a prior art. FIG. 1(a) illustrates an example of the black offset occurred on a screen when the multi-projection of a panorama image is conducted. And FIG. 1(b) illustrates the result of an intensity plot obtained by capturing the image of FIG. 1(a).

The black offset phenomenon shown on the overlapped region as illustrated in FIG. 1 occurs in most of projectors, and becomes a fundamental problem that projecting a seamless image is not available in the multi-projection. Mostly, when the multi-projection is performed on a large screen in such as exhibition centers, the contents close to black are not projected due to such a problem.

Accordingly, a technique that makes it possible to implement a seamless projection by minimizing the black offset in the multi-projection environment is needed in the field.

SUMMARY OF THE INVENTION

An object of the present invention to solve the problem of described above is to provide a method and an apparatus for minimizing a black offset that may occur in a multi-projection environment.

Another object of the present invention to solve the problem of described above is to provide a method and an apparatus which can perform a seamless projection utilizing correlation between the black image projected on a screen and an original black image.

According to an aspect of the present invention, a method for performing multi-projection is provided. It may be implemented that the method comprises estimating the intensity transfer function (ITF) of a plurality of projectors, calculating an optimal black offset threshold for each of the projectors by using each of the ITFs, and applying the optimal black offset threshold to an image projection by each of the projectors.

According to another aspect of the present invention, a pattern image is projected by each of the projectors, and it may be implemented that the ITF is estimated by a still camera capturing the pattern image.

According to still another aspect of the present invention, it may be implemented that the pattern image is generated by increasing the brightness of the R, G and B values of each of the projectors from 0 to 255 by 15 each. According to still another aspect of the present invention, it may be implemented that the ITF is estimated based on a base offset value for each of the projectors.

According to still another aspect of the present invention, it may be implemented that a pure black image is projected on a screen by each of the projectors at the same time, and wherein the base offset is calculated by an average intensity value of all overlapping regions and non-overlapping region for each of the projectors.

According to still another aspect of the present invention, it may be implemented that the optimal black offset threshold for each of the projectors is calculated by using an intensity value of all overlapping regions for each of the projectors.

According to still another aspect of the present invention, it may be implemented that each of the projectors projects an image on a screen to have a region overlapped with the image projected by neighboring projector along a line with other projectors.

According to still aspect of the present invention, a multi-projection system is provided. It may be implemented that the system comprises a screen where an image is projected, a plurality of projectors projecting the image on the screen, a still camera capturing the screen on which the image is projected by the plurality of projectors, and a processor module calculating an intensity transfer function (ITF) using a brightness intensity of the image captured by the still camera and a threshold of an optimal black offset for each of the projectors.

According to still another aspect of the present invention, it may be implemented that the ITF is estimated by projecting a pattern image by each of the projectors.

According to still another aspect of the present invention, it may be implemented that the pattern image is generated by increasing the brightness of the R, G and B values of each of the projectors from 0 to 255 by 15 each.

According to still another aspect of the present invention, it may be implemented that the ITF is estimated based on a base offset value for each of the projectors.

According to still another aspect of the present invention, it may be implemented that a pure black image is projected on a screen by each of the projectors at the same time, and wherein the base offset is calculated by an average intensity value of all overlapping regions and non-overlapping region for each of the projectors.

According to still another aspect of the present invention, it may be implemented that the optimal black offset threshold for each of the projectors is calculated by using an intensity value of all overlapping regions for each of the projectors.

According to still another aspect of the present invention, it may be implemented that the optimal black offset threshold for each of the projectors is calculated by using an average intensity value of all overlapping regions for each of the projectors.

According to still another aspect of the present invention, it may be implemented that each of the projectors projects an image on a screen to have a region overlapped with the image projected by neighboring projector along a line with other projectors.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

Figure 1:
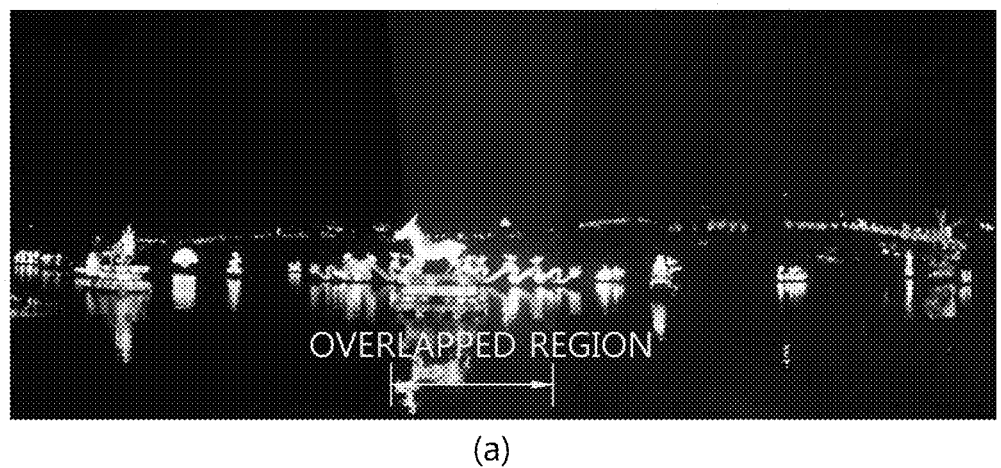
FIG. 1 illustrates an example of occurrence of the black offset on multi-projection according to a prior art.
Figure 1:
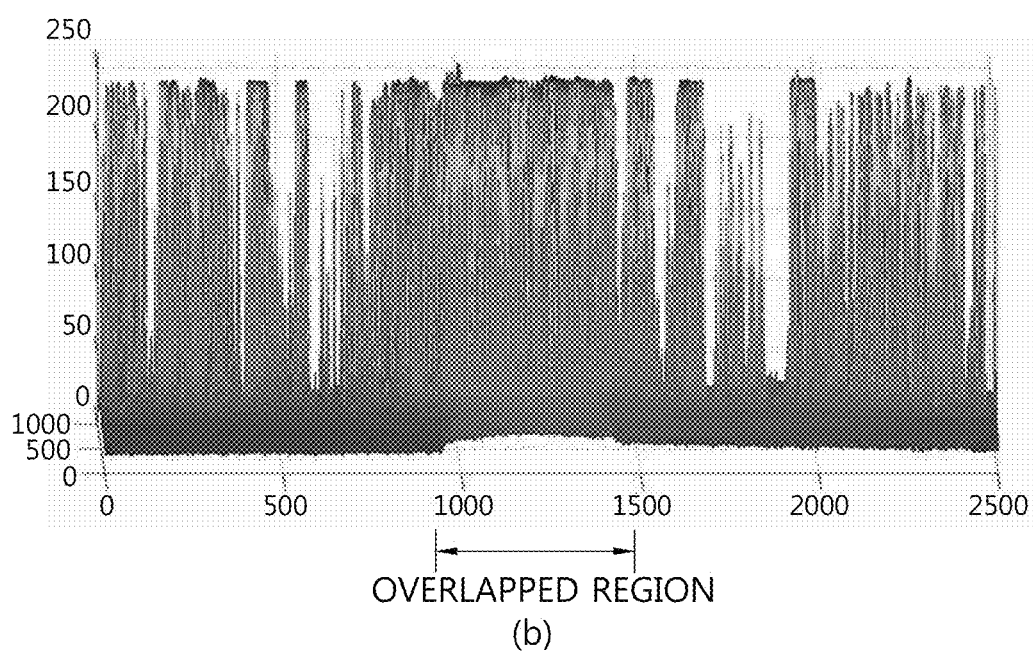

The embodiment of the present invention now will be described in detail hereinafter by reference to the accompanying drawings in order for the person of ordinary skill in this art to implement easily. However, the present invention can be implemented with various modifications, and not limited in the embodiment described herein. In addition, in order to clearly describe the present invention, a part which is not in relation to the description is omitted in the drawings, and similar reference numbers are denoted for the similar parts throughout the specification.

When a part "includes" a certain element, this means that the part may not exclude other elements but further include them throughout the specification, unless any specific opposite description is presented. In addition, the term such as "portion" disclosed in the specification means a unit that processes at least one function or an operation, and this may be implemented by hardware or software, or a combination of hardware and software.

The embodiment of the present invention now will be described in detail by reference to the accompanying drawings.

Figure 2:
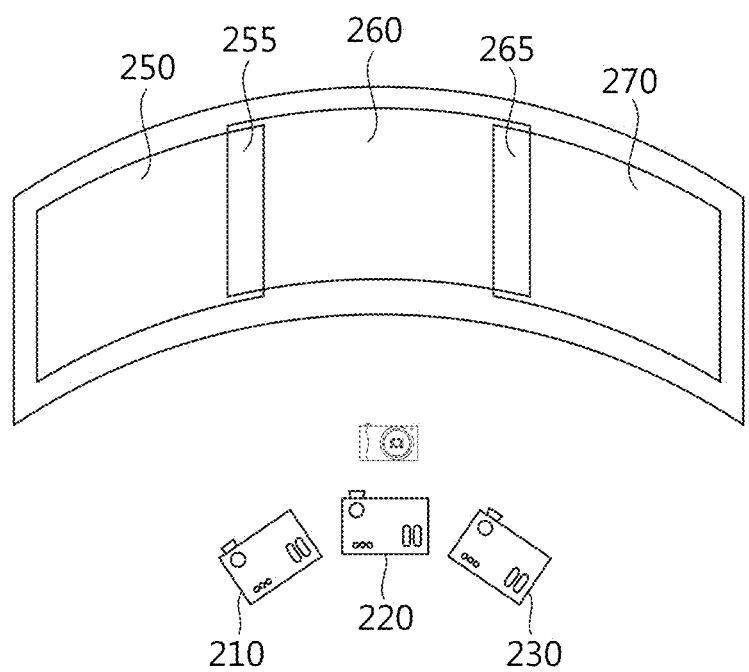
FIG. 2 illustrates a screen on which an image is projected by a plurality of projectors according to the present invention.

FIG. 2 illustrates a screen on which an image is projected by a plurality of projectors according to the present invention. Referring to FIG. 2, each of the regions which are projected by 3 projectors of a first projector 210, a second projector 220 and a third projector 230 may be represented by a first region 250, a second region 260 and a third region 270. In this case, the region projected by the first projector 210 and the second projector 220 has a first overlapped region 255, and the region projected by the second projector 220 and the third projector 230 has a second overlapped region 265. In this time, the brightness of the first overlapped region 255 and the second overlapped region 265 may be controlled to be the most seamless by using the method of minimizing the black offset according to the present invention.

Figure 3:
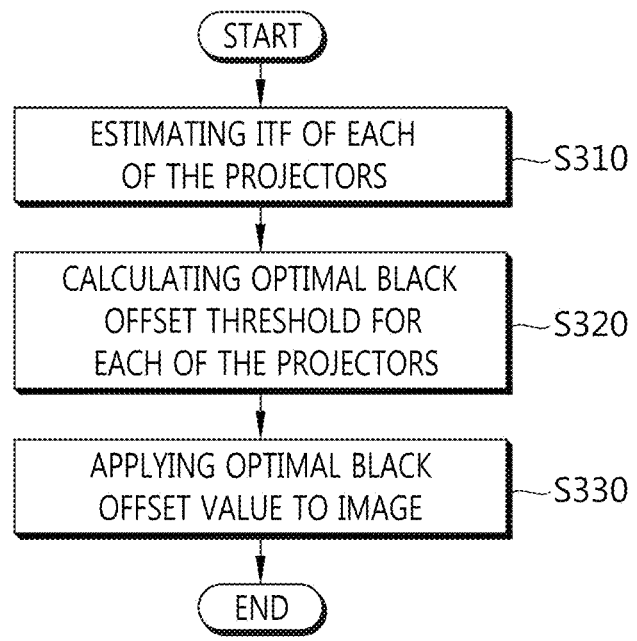
FIG. 3 is a flow chart illustrating the method of minimizing the black offset according to the present invention.

FIG. 3 is a flow chart illustrating the method of minimizing the black offset according to the present invention. Referring to FIG. 3, the method of minimizing the black offset according to the present invention includes estimating the intensity transfer function (ITF) of each of the projectors (step, S310), calculating the optimal black offset threshold for each of the projectors (step, S320), and applying the optimal black offset value to the image which is going to be projected by the projectors (step, S330).

First, estimating the intensity transfer function (ITF) of each of the projectors (the step, S310) may be performed by estimating the ITF after projecting the pattern image by each of the projector and taking a picture of the pattern image with a steal camera. The pattern image may be generated by increasing the brightness of the R, G and B values of the projector from 0 to 255 by 15 each. That is, the pattern image may be generated by increasing from (R, G, B) =(0, 0, 0), (R, G, B) =(15, 15, 15), . . . , to (R, G, B)=(255, 255, 255).

The ITF for each of the projectors may be estimated by Equation 1.

$$ITF_{black}(S)=a \cdot S^2+b \cdot S+\text{base\_offset}, \quad 0 \leq S \leq 255 \qquad \text{[Equation 1]}$$

Figure 4:
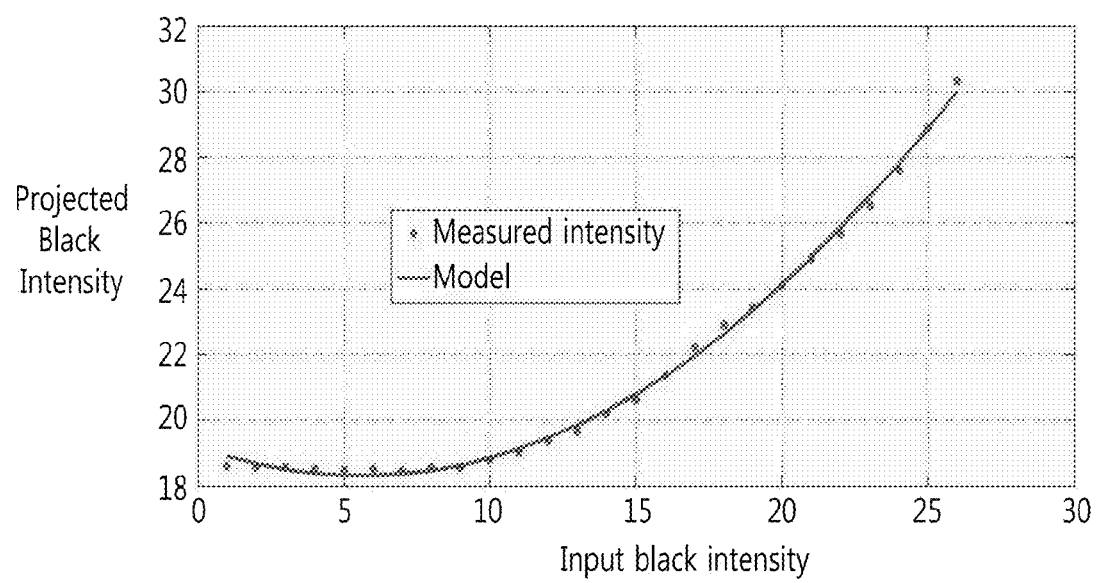
FIG. 4 is a graph illustrating an example of the intensity transfer function (ITF) estimated according to the present invention.

In Equation 1, 'a' and 'b' are approximate value as represented by a=0.028 and b=−0.3142, and the ITF in Equation 1 may be estimated by applying the base offset value base_offset for each of the projectors. The base offset value base_offset may also be obtained by the following method. First, a pure black image ((R, G, B)=(0, 0, 0) is projected on a screen by all projectors at the same time, then is captured by a still camera, and the average intensity value of all overlapping regions and non-overlapping region for each projector is calculated using the captured image, and then the average intensity value corresponds to the base offset value. If the average intensity value is substituted in base_offset in Equation 1, the average intensity value can be depicted by graph as shown in FIG. 4. In FIG. 4, the x axis represents the brightness of the image projected to the projector, and the y axis represents the ITF value estimated.

Figure 5:
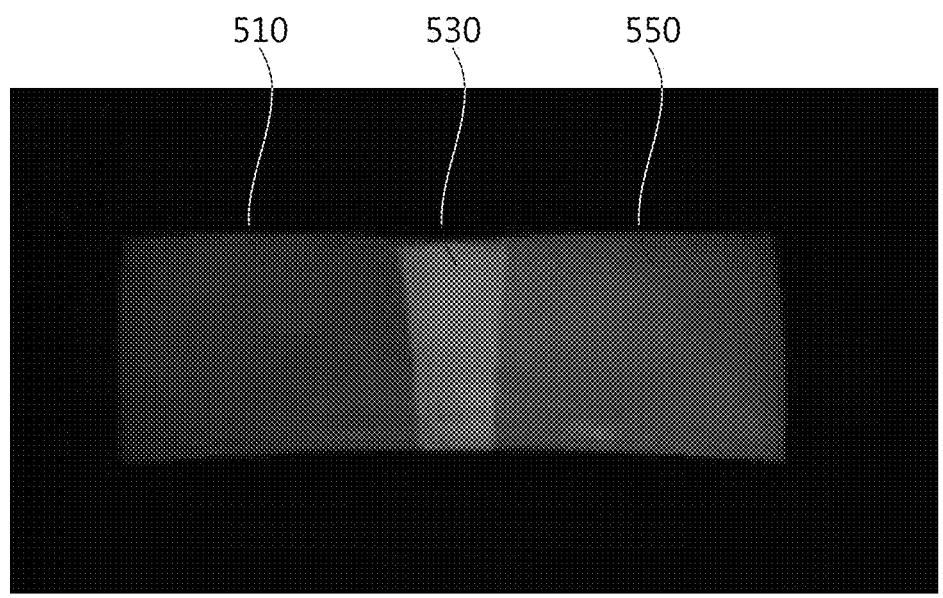
FIG. 5 illustrates an example of the image captured by the still camera after the pure black image is projected on a screen by two projectors.

FIG. 5 illustrates an example of the image captured by the still camera after the pure black image is projected on a screen by two projectors. If it is assumed that the image shown in FIG. 5 is the image projected by the first projector 210 and the second projector 220 shown in FIG. 2, the left image 510 corresponds to the first region 250 of FIG. 2 and the right image 550 corresponds to the second region 260 of FIG. 2. In this time, the overlapped region 530 may be referred as the overlapped region 255. The black offset may be minimized by regulating the brightness intensity of the left image 510 and the right image 550.

In calculating the optimal black offset threshold for each of the projectors (the step, S320), the optimal black offset threshold may be calculated by using the average intensity of all overlapped regions for each of the projectors and Equation 2.

$$\begin{aligned} th_i &= \underset{th(0 \leq th \leq 25)}{\operatorname{argmin}} \, [(\text{avg\_Sat}^i_{BL} - ITF^i(th)) + (\text{avg\_Sat}^i_{BR} - ITF^i(th))] \\ &= \underset{th(0 \leq th \leq 25)}{\operatorname{argmin}} \, [\text{avg\_Sat}^i_{BL} + \text{avg\_Sat}^i_{BR} - 2 \cdot ITF^i(th)] \end{aligned} \qquad \text{[Equation 2]}$$

Equation 2 represents the optimal value to which the image (pixel value) of the non-overlapping region is converted to make a seamless display by estimating the black offset value of the left and right overlapped region, that is, the threshold value of the intensity. In Equation 2, 'i' represents the number of the projector, 'BL' represents the left overlapped region at the $i^{th}$ projector and 'BR' represents the right overlapped region at the $i^{th}$ projector. In this time, all overlapped region is brighter than the non-overlapped region.

For example, the threshold value of the optimal black offset for the second projector 220 in the embodiment of FIG. 2 may be calculated by using the ITF of Equation 1, the average intensity value of the first overlapped regions 255 and the second overlapped region 265, and Equation 2.

Applying the optimal black offset value to the image which is going to be projected by the projectors (the step, S330) applies the optimal black offset value estimated through Equation 2 to the image projection of each projector. As an example, if the optimal threshold of the first projector is 20, the black offset may be minimized by converting the pixel value whose RGB value is less than 20 to 20 among the pixels of the non-overlapped region projected by the first projector and projecting the pixel value on a screen. For example, if the pixel whose RGB value (R, G, B) =(10, 10, 10) is present among the pixels of the non-overlapped region which is to be projected, the black offset in the overlapped region may be minimized by converting the RGB value (R, G, B) =(20, 20, 20).

Figure 6:
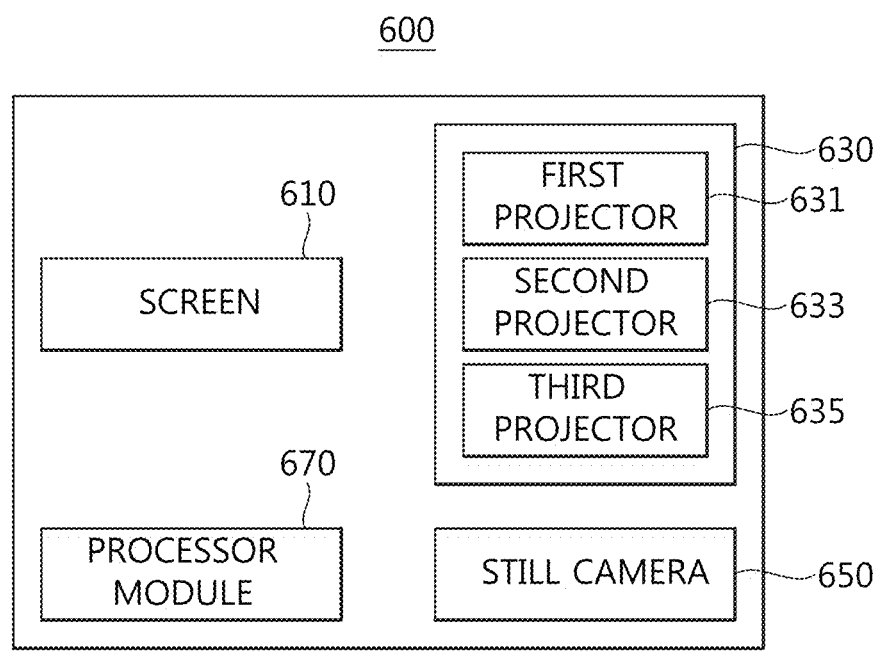
FIG. 6 is a block diagram schematically illustrating the multi-projection system according to the present invention.

FIG. 6 is a block diagram schematically illustrating the multi-projection system according to the present invention. Referring to FIG. 6, the multi-projection system according to the present invention includes a screen 610, a projector 630, a still camera 650 and a processor module 670.

The screen 610 is the picture surface on which an image is displayed using a plurality of projectors 630. In the screen 610, the images from the plurality of projectors 630 may be displayed in a line, and the images from the plurality of projectors 630 may be displayed with being overlapped in a certain region for displaying the seamless natural image.

The projector 630 displays an image on the screen 610. A plurality of projectors 631, 633 and 635 may project images on a screen 610, as shown in FIG. 2, each of the projectors 210, 220 and 230 may have a plurality of overlapped regions 255 and 265 by performing image projection. The projector 630 may project a pattern image for estimating the intensity transfer function (ITF) with respect to each of the projectors 631, 633 and 635.

When the pattern image is projected by the projector 630, the still camera 650 may capture the screen 610 on which the pattern image is projected in order to obtain the ITF.

When the screen 610 on which the pattern image is projected is captured by the still camera, the processor module 670 estimates the ITF for each of the projectors 631, 633 and 635 by using the brightness intensity of the captured image. The method of estimating the ITF may be performed by Equation 1. In addition, the processor module 670 calculates the threshold of the optimal black offset for each of the projectors 631, 633 and 635. The optimal black offset may be calculated by using Equation 2. If the threshold of the black offset is calculated by the processor module 670, each of the projectors 631, 633 and 635 project images having the brightness which is as bright as or brighter than the calculated threshold when projecting images and it makes the black offset be minimized.

Figure 7:
FIG. 7 illustrates the images compared between before and after the minimized black offset being applied according to the present invention.
Figure 7:

FIG. 7 illustrates the images compared between before and after the minimized black offset being applied according to the present invention. FIG. 7(*a*) illustrates the panorama image projected on a screen before minimizing the black offset, and FIG. 7(*b*) illustrates the panorama image projected on a screen with the minimized the black offset being applied.

As known from the comparison illustrated in FIG. 7, according to the present invention, the seamless image may be projected on a screen by minimizing the black offset phenomenon which is occurred when a plurality of projectors project an image on a screen.

So far, the description of the present invention has been exemplary presented, many modifications and variations may be made by those of ordinary skill in the art without departing from the spirit and scope of the present invention. Accordingly, the embodiments disclosed in the present invention are not intended to limit the inventive concept of the present invention, but rather to describe the invention, and the inventive concept is not limited by the embodiments. The scope of the present invention should be interpreted by the claims below, and it should be interpreted that all inventive concepts which are equivalent to it fall into the scope of the present invention.

What is claimed is:

1. A method for performing multi-projection comprising:
   executing by a projection processor module computer program code stored on a non-transitory storage medium, the computer program code comprising:
   program code that estimates the intensity transfer function (ITF) of a plurality of projectors;
   program code that calculates an optimal black offset threshold for each of the projectors by using each of the ITFs; and
   program code that applies the optimal black offset threshold to an image projection by each of the projectors,
   wherein the processor module executes the computer program code stored on the non-transitory storage medium in accordance with Equations 1 and 2 below, $$ITF_{black}(S) = a*S^2 + b*S + \text{base\_offset}, 0 \le S \le 255 \quad \text{[Equation 1]}$$

$$\begin{aligned} th^i &= \operatorname*{argmin}_{th(0 \le th \le 25)} [(\text{avg\_Sat}^i_{BL} - ITF^i(th)) + \\ &\quad (avgSat^i_{BR} - ITF^i(th)))] \\ &= \operatorname*{argmin}_{th(0 \le th \le 25)} [\text{avg\_Sat}^i_{BL} + avgSat^i_{BR} - 2*ITF^i(th)] \end{aligned} \quad \text{[Equation 2]}$$

wherein in Equation 1, S is a range of values between 0 and 255, 'a' and 'b' are approximate values represented by a=0.028 and b=−0.3142, and the base offset value base offset is obtained by projecting a pure black image on a screen by all projectors at the same time, capturing the pure black image by a still camera, calculating the average intensity value of all overlapping regions and non-overlapping region for each projector using the captured image, with the calculated average intensity value corresponding to the base offset value, and wherein Equation 2 represents the optimal value to which the image of the non-overlapping region is converted to make a seamless display by estimating the black offset value of the left and right overlapped region to provide the threshold value of the intensity, T represents the number of the projector, 'BL' represents the left overlapped region at the $i^{th}$ projector and 'BR' represents the right overlapped region at the $i^{th}$ projector.

2. The method for performing multi-projection of claim 1, wherein a pattern image is projected by each of the projectors, and wherein the ITF is estimated by a still camera capturing the pattern image.

3. The method for performing multi-projection of claim 2, wherein the pattern image is generated by increasing the brightness of the R, G and B values of each of the projectors from 0 to 255 by 15 each.

4. The method for performing multi-projection of claim 1, wherein the ITF is estimated based on a base offset value for each of the projectors.

5. The method for performing multi-projection of claim 4, wherein a pure black image is projected on a screen by each of the projectors at the same time, and wherein the base offset is calculated by an average intensity value of all overlapping regions and non-overlapping regions for each of the projectors.

6. The method for performing multi-projection of claim 1, wherein the optimal black offset threshold for each of the projectors is calculated by using an intensity value of all overlapping regions for each of the projectors.

7. The method for performing multi-projection of claim 1, wherein the optimal black offset threshold for each of the projectors is calculated by using an average intensity value of all overlapping regions for each of the projectors.

8. The method for performing multi-projection of claim 1, wherein each of the projectors projects an image on a screen to have a region overlapped with the image projected by neighboring projectors along a line with other projectors.

9. A multi-projection system comprising:
a screen where an image is projected:
a plurality of projectors projecting the image on the screen;
a still camera capturing the screen on which the image is projected by the plurality of projectors; and
a processor module calculating an intensity transfer function (ITF) using a brightness intensity of the image captured by the still camera and a threshold of an optimal black offset for each of the projectors,
wherein the processor module executes the computer program code stored on the non-transitory storage medium, the computer program code comprising program code that calculates the ITF using Equations 1 and 2 below, $$ITF_{black}(S) = a*S^2 + b*S + \text{base\_offset}, 0 \leq S \leq 255 \quad \text{[Equation 1]}$$

$$\begin{aligned}th^i &= \underset{th(0 \leq th \leq 25)}{\operatorname{argmin}} [(\text{avg\_Sat}^i_{BL} - ITF^i(th)) + \\ &\quad (avgSat^i_{BR} - ITF^i(th)))] \\ &= \underset{th(0 \leq th \leq 25)}{\operatorname{argmin}} [\text{avg\_Sat}^i_{BL} + avgSat^i_{BR} - 2*ITF^i(th)]\end{aligned} \quad \text{[Equation 2]}$$

wherein in Equation 1, S is a range of values between 0 and 255, 'a' and 'b' are approximate values represented by a=0.028 and b=−0.3142, and the base offset value base offset is obtained by projecting a pure black image on a screen by all projectors at the same time, capturing the pure black image by a still camera, calculating the average intensity value of all overlapping regions and non-overlapping region for each projector using the captured image, with the calculated average intensity value corresponding to the base offset value, and wherein Equation 2 represents the optimal value to which the image of the non-overlapping region is converted to make a seamless display by estimating the black offset value of the left and right overlapped region to provide the threshold value of the intensity, T represents the number of the projector, 'BL' represents the left overlapped region at the $i^{th}$ projector and 'BR' represents the right overlapped region at the $i^{th}$ projector.

10. The multi-projection system of claim 9, wherein the ITF is estimated by projecting a pattern image by each of the projectors.

11. The multi-projection system of claim 10, wherein the pattern image is generated by increasing the brightness of the R, G and B values of each of the projectors from 0 to 255 by 15 each.

12. The multi-projection system of claim 9, wherein the ITF is estimated based on a base offset value for each of the projectors.

13. The multi-projection system of claim 9, wherein a pure black image is projected on a screen by each of the projectors at the same time, and wherein the base offset is calculated by an average intensity value of all overlapping regions and non-overlapping regions for each of the projectors.

14. The multi-projection system of claim 9, wherein the optimal black offset threshold for each of the projectors is calculated by using an intensity value of all overlapping regions for each of the projectors.

15. The multi-projection system of claim 9, wherein the optimal black offset threshold for each of the projectors is calculated by using an average intensity value of all overlapping regions for each of the projectors.

16. The multi-projection system of claim 9, wherein each of the projectors projects an image on a screen to have a region overlapped with the image projected by neighboring projectors along a line with other projectors.

* * * * *